United States Patent [19]
Sato et al.

[11] Patent Number: 5,811,782
[45] Date of Patent: Sep. 22, 1998

[54] BINARY DEVICE FOR BAR CODE READER

[75] Inventors: Shinichi Sato; Isao Iwaguchi; Ichiro Shinoda; Tomoyuki Kashiwazaki, all of Kawasaki, Japan

[73] Assignee: Fujitu Limited, Kawasaki, Japan

[21] Appl. No.: 733,787

[22] Filed: Oct. 18, 1996

Related U.S. Application Data

[63] Continuation of Ser. No. 234,876, Apr. 28, 1994, abandoned.

[30] Foreign Application Priority Data

Aug. 11, 1993 [JP] Japan .................................. 5-199322

[51] Int. Cl.⁶ .......................................................... G06K 7/10
[52] U.S. Cl. ......................................... 235/462; 235/463
[58] Field of Search .................................... 235/462, 463

[56] References Cited

U.S. PATENT DOCUMENTS

| | | | |
|---|---|---|---|
| 5,061,843 | 10/1991 | Sato et al. ................................ | 235/463 |
| 5,068,520 | 11/1991 | Sato ....................................... | 235/463 |
| 5,142,130 | 8/1992 | Sato ....................................... | 235/462 |
| 5,268,564 | 12/1993 | Metlitsky et al. ...................... | 235/462 |
| 5,272,323 | 12/1993 | Martino .................................. | 235/462 |

FOREIGN PATENT DOCUMENTS 3-2990 1/1991 Japan .

*Primary Examiner*—Donald T. Hajec
*Assistant Examiner*—Mark Tremblay
*Attorney, Agent, or Firm*—Armstrong, Westerman, Hattori, Mcleland & Naughton

[57] ABSTRACT

A binary device suitable for a bar code reader performs a binary signal conversion, without depending on a laser beam scanning rate. The binary device includes differentiating circuitry for differentiating an analog signal including a binary code signal, peak point detecting circuitry for detecting the positive and negative peak points of a differential signal from the differentiating circuitry, first gate signal outputting circuitry for outputting a first gate signal when the differential signal is more than a first preset level, second gate signal outputting circuitry for outputting a second gate signal when the differential signal is less than a second preset level, positive peak point detection sequential circuitry for detecting a positive peak point from the peak point detecting circuitry when a signal variation in the first gate signal is detected, and negative peak point detection sequential circuitry for detecting a negative peak point from the peak point detecting circuitry after a change in the second gate signal is detected.

12 Claims, 14 Drawing Sheets

TIME ⟶

BINARY DEVICE FOR BAR CODE READER

This application is a continuation of application Ser. No. 08/234,876 filed Apr. 28. 1994, now abandoned.

BACKGROUND OF THE INVENTION

1. Field of the Invention

The present invention relates to a binary device for a bar code reader.

2. Description of the Related Art

FIG. 9 is a block diagram showing the configuration of the bar code reading device bar code reader). Referring now to FIG. 9, numeral 1 represents a bar code printed on the surface of an article, the bar code being generally formed of plural black bars and white bars arranged alternately. A predetermined datum is represented based on the width of each black bar and the width of each white bar.

An optical system 2 irradiates a laser beam L2 to the bar code 1 and receives a reflected light R1, or the laser beam L2 reflected by the bar code 1. The optical system 2 is also constituted of a laser emitting unit 3, a scanning mechanism 4, and an optical converting unit 5. The laser emitting unit 3 includes a semiconductor laser device for emitting the laser beam L1.

The scanning mechanism 4 is constituted of a polygon mirror that is rotatably driven with, for example, a motor. The scanning mechanism 4 also irradiates the laser beam L2 to the plural black bars and white bars forming the bar code 1, the beam L2 formed by reflecting the laser beam L1 from the laser emitting unit 3, while it moves and scans the laser beam at a fixed rate and in the direction perpendicular to the black and white bars of the bar code 1.

The scanning mechanism 4 irradiates the reflected light R1 as the reflected light R2 to the photoelectric converting unit 5, the reflected light R1 being the laser beam L2 reflected by the bar code 1.

The photoelectric converting unit 5 is formed of a photoelectric converting element, for example, a photo diode. The photoelectric converting unit 5 also receives the reflected light R2 (light input signal) via the scanning mechanism 4 to convert it to an electric signal (analog value) corresponding to the light amount thereof.

The A/D converter unit (binary device) 6 digitizes the electric signal from the photoelectric converting unit 5 to convert it to a binary signal including a black level signal corresponding to each black portion and a white level signal corresponding to each white portion in the bar code 1. The white level signal represents a high level signal and the black level signal represents a low level signal because the light amount of the reflected light R2 reflected by each white bar is larger than that of the reflected light R2 reflected by each black bar in the binary signal.

The A/D converter unit 6 is shown in FIG. 10. Referring to FIG. 10, the A/D converter unit 6 is constituted by amplifiers 34, 37 and 40, a differentiating circuit 35, a filter 36, an integrating circuit 38, comparators 39, 47 and 48, a DC level circuit 41, a peak hold circuit 42, a discharging circuit 43, a reverse amplifier 44, delay circuits 49 and 50, AND circuits 51 and 52, and an inverter circuit 53.

That is, the amplifier 34 amplifies the output of the optical system 2 and outputs an analog signal (input signal) a. The differentiating circuit 35 differentiates the input signal a to output a differential signal b via the filter 36.

The amplifier 37 amplifies the differential signal b. The integrating circuit 38 integrates and delays the amplified signal to output as an integrated and delayed signal e. The comparator 39 compares the integrated and delayed signal e with the differential signal b to output a comparison result signal k.

The differential signal b from the filter 36 is amplified by the amplifier 40. Then the slice signal generating circuit 45 inputs the outcome to produce slice signals c and d to the gate signal generating circuit 46. The slice signal generating circuit 45 is formed of a DC level circuit 41, a peak hold circuit 42, a discharging circuit 43, and a reverse amplifier 44. The gate signal generating circuit 46 is formed of comparators 47 and 48, and delay circuits 49 and 50.

In the gate signal generating circuit 46, the comparator 47 inputs the slice signal d from the slice signal generating circuit 45 and the differential signal b from the amplifier 40 and outputs the gate signal g. The comparator 48 inputs the slice signal c from the slice signal generating circuit 45 and the differential signal b from the amplifier 40 and outputs the gate signal g. The delay circuit 49 inputs the gate signal g from the comparator 47 and outputs the delay gate signal h. The delay circuit 50 inputs the gate signal f from the comparator 48 and outputs the delay gate signal h.

The AND circuit 51 inputs the comparison result signal k and the delay gate signal i from the delay circuit 49 and outputs an output signal m. The AND circuit 52 inputs the signal obtained by inverting the comparison result signal k by means of the inverter circuit 53 and the delay gate signal h from the delay circuit 50 and outputs the output signal n.

In FIG. 9, numeral 7 represents a bar width counter for counting clock signals from the clock generator 8. The bar width counter 7 also outputs as a clock signal count value corresponding to the time widths of the black level signal portion and the white level signal portion of a binary signal from the A/D converter unit 6, or each black bar width and each white bar width of an actual bar code 1.

Furthermore, the memory 9 stores the bar width count value from the bar width counter 7. The CPU 10 extracts and demodulates predetermined data of the bar code 1 based on the bar width count value (a value corresponding to each black bar width or each white bar width) stored in the memory 9.

In the above structure, the scanning mechanism 4 irradiates the laser beam L1 emitted from the laser emitting unit 3 as the laser beam L2 to the black bar and the white bar of the bar code 1 while it moves and scans the laser beam at a constant rate and in the direction perpendicular to the black bar and white bar of the bar code 1.

The laser beam L2 emitted from the scanning mechanism 4 is scatteringly reflected on a portion of the bar code 1 and is re-irradiated as the reflected light R1 to the scanning mechanism 4. The reflected light R1 varies its reflection angle as the laser beam L2 scans and moves. However the polygon mirror constituting the scanning mechanism 4 reflects the reflected light R1 to input it as the reflected light R2 to the photoelectric element in the photoelectric converting unit 5 arranged at a predetermined place.

The photoelectric converting unit 5 converts the reflected light R2 to an electric signal corresponding to the amount thereof. The A/D converter unit 6 digitizes the electric signal into a binary signal including a black level signal corresponding to each black level portion and a white level signal corresponding to each white level portion of the bar code 1. The A/D converter unit 6 shown in FIG. 9 outputs signals with various waveforms shown in each block in FIG. 11.

The input signal a is an analog signal including the coded signal for the bar code 32, or a signal obtained by amplifying the output of the light receiving unit 33 by the amplifier 34. The input signal k is a signal obtained by differentiating the input signal a by the differentiating circuit 35. The signal e is a signal obtained by integrating and delaying the differential signal k by the integrating circuit 38.

The comparison result signal k, which is obtained by comparing the integrated and delayed signal e with the differential signal k by the comparator 39, indicates a transient point of the input signal a. The comparison result signal k is in an indefinite state at a place where the input signal a varies at a small amount.

The signals c and d are slice signals produced in the slice signal generating circuit 45. The gate signals f and g are formed in accordance with the slice signals c and d. The delay gate signals h and i are formed by delaying the gate signals f and g by the delay circuits 49 and 50. The comparison result signal k is formed by delaying the differential signal k. The signals h and g are formed by delaying the gate signals f and g.

The comparison result signal k and the delay gate signal h are ANDed to gate the indefinite state of the comparison result signal k, thus producing the signal n corresponding to the transient point (a cross point of the analog signal and the reference point L) of the input signal (analog signal). The comparison result signal k and the delay gate signal i are ANDed to gate the indefinite state of the comparison result signal k, thus producing the signal m corresponding to the transient point (a cross point of the analog signal and the reference point L). The signals n and m are inputted to a flipflop to make a digital signal for a bar code.

As described above, the A/D converter unit 6 produces a digital signal. Next, as shown in FIG. 9, the bar width counter 7 counts clock signals from the clock generator 8 so that the time width (a value corresponding to the widths of each black bar and each white bar of an actual bar code 1) of the black level signal portion and the white level signal portion of the binary signal from the A/D converter unit 6 is measured as the count value of the clock signal. The memory 9 stores temporarily the count value. The CPU 10 subjects the bar width count value stored in the memory 9 to a predetermined demodulation process to extract and demodulate the determined data of the bar code 1.

As described above, in the binary device in a bar code reader, the integrating operation attenuates noises with high frequency components, thus including the bar width detection accuracy.

In the binary device in a bar code reader, in order to perform a peak detection, the integrating circuit 38 integrates and delays the differential signal b to produce the integration delay signal e. However, when the laser beam L2 is scanned at a low speed, the integrating operation results in a small delay.

For that reason, the delay time in the comparison result signal k from the peak point of an actual differential signal does not strictly have a fixed value. However, the gate signals f and g, or digital signals, have always fixed values.

Hence when the relation between the delay time from the peak point of a differential signal in the comparison result signal k and the delay time of a gate signal is suitable, the leading timing of the output signal m agrees with the peak detection signal k, as shown in FIG. 12. However, as shown in FIG. 13, when the delay time from the peak point of the differential signal is small, the leading timing of the output signal m becomes different from that of the peak detection signal k. As shown in FIG. 14, when the delay time from the peak point of a differential signal is large, the output signal m may not be outputted. When the above situation occurs, there is a disadvantage in that the conversion accuracy to a binary signal is degraded.

SUMMARY OF THE INVENTION

The present invention is made to overcome the above mentioned problems. An object of the present invention is to provide a binary device suitable for a bar code reader which can perform a suitable binary signal conversion, without depending on the laser beam scanning rate.

In order to achieve the above object, according to the present invention, the binary device suitable for a bar code reader is characterized by differentiating means for differentiating an analog signal including a binary code signal; peak point detecting means for detecting positive and negative peak points of a differential signal from the differentiating means; first gate signal outputting means for outputting a first gate signal when the differential signal from the differentiating means is more than a first set level; second gate signal outputting means for outputting a second gate signal when the differential signal from the differentiating means is more than a second set level; positive peak point detection sequential means for detecting a positive peak point from the peak point detecting means after a variation in the first gate signal from the first gate signal outputting means has been detected; and negative peak point detection sequential means for detecting a negative peak point from the peak point detecting means after a variation in the second gate signal from the second gate signal outputting means has been detected.

The binary device suitable for a bar code reader according the present invention is characterized in that the positive peak point detection sequential means detects a positive peak point from the peak point detecting means during a first set time period after a signal change in the first gate signal from the first gate signal outputting means has been detected; and the negative peak point detection sequential means detects a negative peak point from the peak point detecting means during a second set time period after a signal change in the second gate signal from the second gate signal outputting means has been detected.

Furthermore, the binary device suitable for a bar code reader according to the present invention is characterized by further including resetting means for resetting a bar code reading sequence when the positive peak point detection sequential means cannot detect the positive peak point from the peak point detecting means after a lapse of the first set time or when the negative peak point detection sequential means cannot detect the negative peak point from the peak point detecting means after a lapse of the second set time.

The binary device suitable for a bar code reader according the present invention is characterized in that the positive peak point detection sequential means detects the positive peak point from the peak point detecting means between the third set time and the time of detection of the trailing or leading edge of a first gate signal detected after the leading or trailing edge of the first gate signal from the first gate signal outputting means has been detected. The negative peak point detection sequential means detects the negative peak point from the peak point detecting means between the fourth set time and the time of detection of the trailing or leading edge of a second gate signal detected after the leading or trailing edge of the second gate signal from the second gate signal outputting means has been detected.

The binary device for a bar code reader according to the present invention is characterized by further including resetting means for resetting the bar code reading sequence when the positive peak point detection sequential means cannot detect the positive peak point from the peak point detecting means after the third set time or when the negative peak point detection sequential means cannot detect the negative peak point from the peak point detecting means after the fourth set time.

The binary device suitable for a bar code reader according to the present invention is characterized in that the peak point detecting means includes delay means for delaying the differential signal from the differentiating means, and comparing means for comparing the delay signal delayed by the delay means with the differential signal from the differentiating means to detect the positive and negative peak points of the differential signal.

The bar code reader according to the present invention is characterized in that the peak point detecting means includes double differentiating means for further differentiating the differential signal from the differentiating means; and zero-cross point detecting means for detecting the zero-cross point of the double differentiated signal from the double differentiating means to detect the positive and negative peak points of the differentiating signal.

Therefore, the binary device according to the present invention can perform a suitable binary signal conversion, without depending on the laser beam scanning rate.

DESCRIPTION OF THE PREFERRED EMBODIMENTS

Referring to the attached drawings, an explanation will be made in detail as for preferred embodiments of the binary device according to the present invention.

Figure 1:
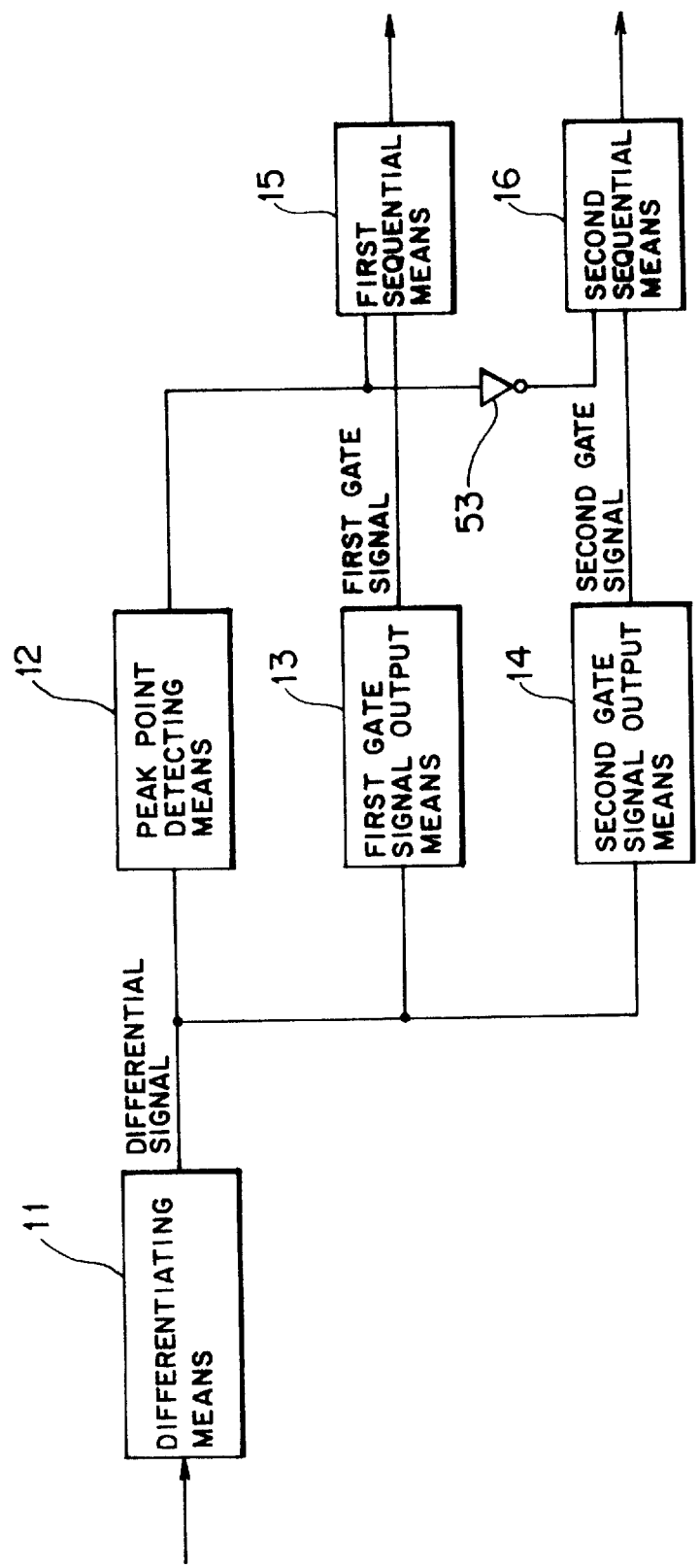
FIG. 1 is a block diagram showing an aspect of the present invention.

FIG. 1 is a block diagram showing an aspect of the present invention. Referring to FIG. 1, the differentiating means 11 differentiates an analog signal which includes a binary code signal.

The peak point detecting means 12 detects the positive and negative peak points in accordance with the differential signal from the differentiating means 11. The first gate signal outputting means 13 outputs a first gate signal when the differential signal from the differentiating means 11 is more than a first set level. The second gate signal outputting means 14 outputs a second gate signal when the differential signal from the differentiating means 11 is less than a second set value. The positive peak point determining means 15, also referred to hereafter as first sequential means 15, detects the positive peak point of a differential signal from the peak point detecting means 12 after the signal variation of the first gate signal from the first gate signal outputting means 13 has been detected. The negative peak point determining means 16, also referred to hereafter as first sequential means 16, detects the negative peak point of a differential signal from the peak point detecting means 12 after the signal variation of the second gate signal from the second gate signal outputting means 14 has been detected.

Numeral 53 represents an inverter circuit for inverting the signal from the peak point detecting means 12.

In the binary device in a bar code reader according to the present invention, the positive peak point determining means 15 detects the positive peak point of a differential signal from the peak point detecting means 12 during a first set time period after a change in the first gate signal from the first gate signal outputting means 13 has been detected. The negative peak point determining means 16 detects the negative peak point of a differential signal from the peak point detecting means 12 during a second set time period after a change in the second gate signal from the second gate signal outputting means 14 has been detected.

Furthermore, in the binary device in a bar code reader according to the present invention, reset means is arranged to re-start the foregoing sequence of events (hereafter referred to as a bar code reading sequence) when the positive peak point determining means 15 cannot detect the positive peak point from the peak point detecting means 12 after a lapse of the first set time, or when the negative peak point determining means 16 cannot detect the negative peak point from the peak point detecting means 12 after a lapse of the second set time.

In the binary device in a bar code reader according to the present invention, the positive peak point determining means 15 detects the positive peak point from the peak point detecting means 12 between the third set time (which is the period between point P' and the point T in FIG. 4) and the time P of detection of the trailing or leading edge of a first gate signal detected after the leading or trailing edge of the first gate signal from the first gate signal outputting means 13 has been detected. The negative peak point determining means 16 detects the negative peak point from the peak point detecting means 12 between the fourth set time and the time of detection P' of the trailing or leading edge of a second gate signal detected after the leading or trailing edge of the second gate signal from the second gate signal outputting means 14 has been detected.

In the binary device in a bar code reader according to the present invention, resetting means is arranged to re-start the bar code reading sequence when the positive peak point determining means 15 cannot detect the positive peak point from the peak point detecting means 12 after a lapse of the third set time, or when the negative peak point determining means 16 cannot detect the negative peak point from the peak point detecting means 12 after a lapse of the fourth set time. In a binary device for a bar code reader, the peak point detecting means 12 is formed of delay means for delaying the differential signal from said differentiating means 11, and comparing means for comparing the delay signal delayed by the delay means with the differential signal from the differentiating means 11 to detect the positive and negative peak points of the differential signal.

In the binary device for a bar code reader, the peak point detecting means 12 is formed of double differentiating means for further differentiating the differential signal from the differentiating means 11; and zero-cross point detecting means for detecting the zero-cross point of the signal doubly differentiated by the double differentiating means to detect the positive and negative peak points of the differentiating signal.

In the binary device for a bar code reader, the peak point detecting means 12 detects the positive and negative peak points of a differential signal from the differentiating means 11 when the differentiating means 11 differentiates an analog signal including a binary code signal to be inputted.

Furthermore, the first gate signal outputting means 13 outputs a first gate signal when the differential signal from the differentiating means 11 is more than the first set level. The second gate signal outputting means 14 outputs the second gate signal when the differential signal from the differentiating means 11 is less than the second set level.

The positive point determining means 15 detects the positive peak point from the peak point detecting means 12 after the variation in the first gate signal from the first gate signal outputting means 13 has been detected. The negative peak point determining means 16 detects the negative peak point from the peak point detecting means 12 after the variation in the second gate signal from the second gate signal outputting means 14 has been detected.

In the binary device for a bar code reader according to the present invention, the positive peak point determining means 15 detects the positive peak point from the peak point detecting means 12 during the first set time period after the variation in the first gate signal from the first gate signal outputting means 13 has been detected. The negative peak point determining means 16 detects the negative peak point from the peak point detecting means 12 during the second set time period after the variation in the second gate signal from the second gate signal outputting means 14 has been detected.

In the binary device for a bar code reader according to the present invention, the resetting means resets a bar code reading sequence when the positive peak point determining means 15 cannot detect the positive peak point from the peak point detecting means 12 after a lapse of the first set time, or the negative peak point determining means 16 cannot detect the negative peak point from the peak point detecting means 12 after a lapse of the second set time.

In the binary device for a bar code reader, the positive peak point determining means 15 detects the positive peak point from the peak point detecting means 12 between the third set time and the time at which the trailing or leading edge of a first gate signal is detected after the leading or trailing edge of the first gate signal from the first gate signal outputting means 13 has been detected. The negative peak point determining means 16 detects the negative peak point from the peak point detecting means 12 between the fourth set time and the time at which the trailing or leading edge of the second gate signal is detected after the leading or trailing edge of the second gate signal from the second gate signal outputting means 14 has been detected.

In the binary device for a bar code reader according to the present invention, the resetting means re-starts the bar code reading sequence when the positive point determining means 15 cannot detect the positive peak point from the peak point detecting means 12 after a lapse of the third set time, or the negative peak point determining means 16 cannot detect the negative peak point from the peak point detecting means 12 after a lapse of the fourth set time.

In the binary device for a bar code reader according to the present invention, the delay means delays the differential signal from the differentiating means 11 to detect the peak point by means of the peak point detecting means 12. The comparing means compares the signal delayed by the delay means with the differential signal from the differentiating means 11 to detect the positive and negative peak points of the differential signal.

In the binary device for a bar code reader according to the present invention, in order to detect the peak point with the peak point detecting means 12, the double differentiating means further differentiates the differential signal from the differentiating means 11. Then the zero-cross point detecting means detects the zero-cross point based on the double differential signal from the double differentiating means to detect the positive and negative peak points of the differential signal.

As described above, according to the present invention, the binary device for a bar code reader is constituted by differentiating means 11 for differentiating an analog signal including a binary code signal; peak point detecting means 12 for detecting positive and negative peak points of a differential signal from the differentiating means 11; first gate signal outputting means 13 for outputting a first gate signal when the differential signal from the differentiating means 11 is more than a first set level; second gate signal outputting means 14 for outputting a second gate signal when the differential signal from the differentiating means 11 is less than a second set level; positive peak point determining means 15 for detecting a positive peak point from the peak point detecting means 12 after the first gate signal outputting means 13 has detected a signal variation in the first gate signal; and second gate signal outputting means 14 for detecting a negative peak point from the peak point detecting means 12 after the second gate signal outputting means 14 has detected a signal variation in the second gate signal. There is an advantage in that the simplified configuration can perform a suitable binary signal conversion, without depending on the laser beam scanning rate.

Explanation of First Embodiment

Figure 2:
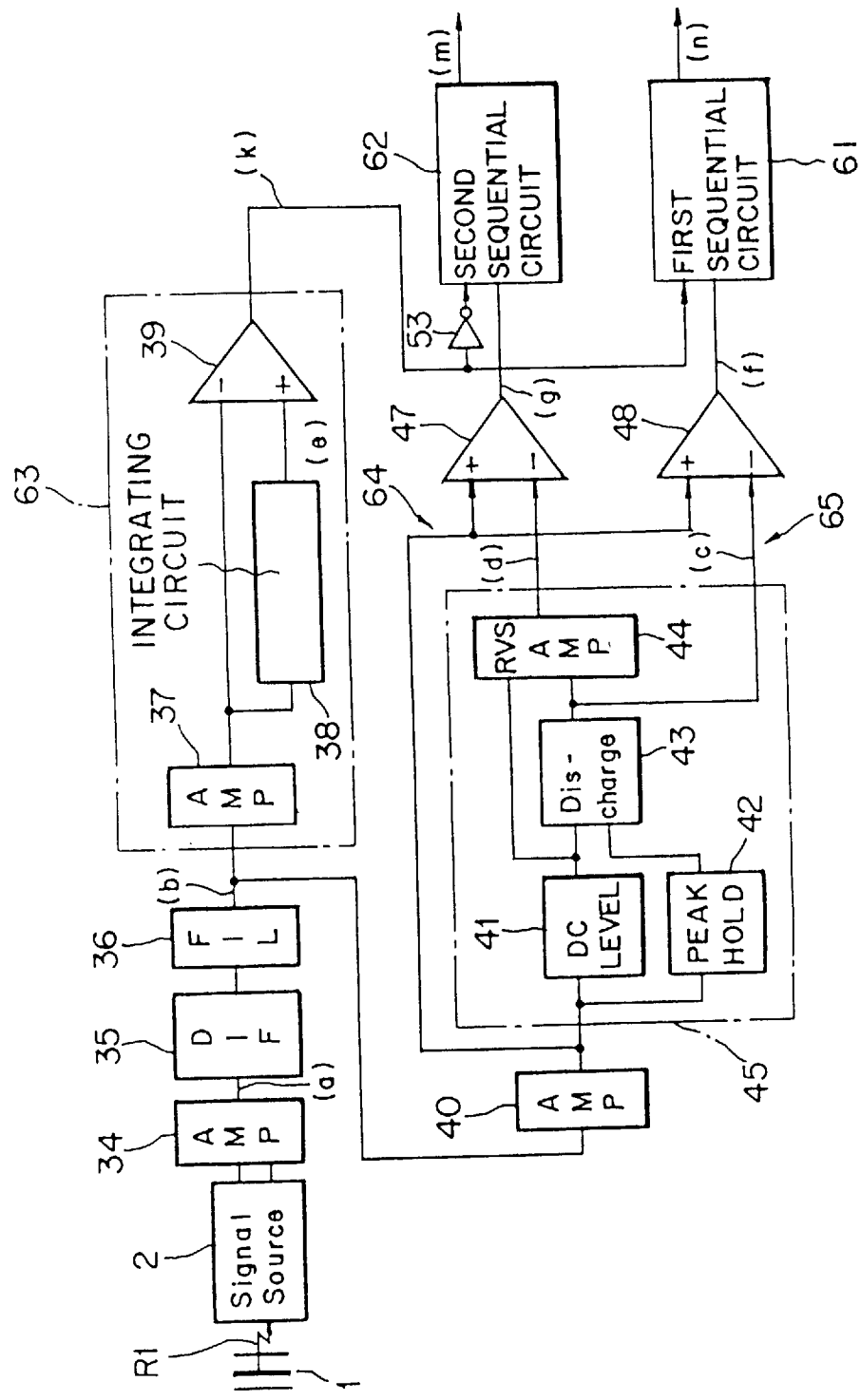
FIG. 2 is a block diagram showing the first embodiment of the present invention.

FIG. 2 is a block diagram showing the binary device for a bar code reader according to the first embodiment of the present invention. In FIG. 2, the binary device is used for the bar code reader shown in FIG. 9. The binary device digitizes an electrical signal from the photoelectric converter unit 5 to convert it into a binary signal including a black level signal corresponding to each black bar of the bar code 1 and a white level signal corresponding to each white bar of the bar code 1. As for the binary signal, the white level signal represents a high level signal and the black level signal represents a low level because the light amount of the reflection light R1 from each white bar portion is generally larger than that from each black bar portion.

Figure 10:
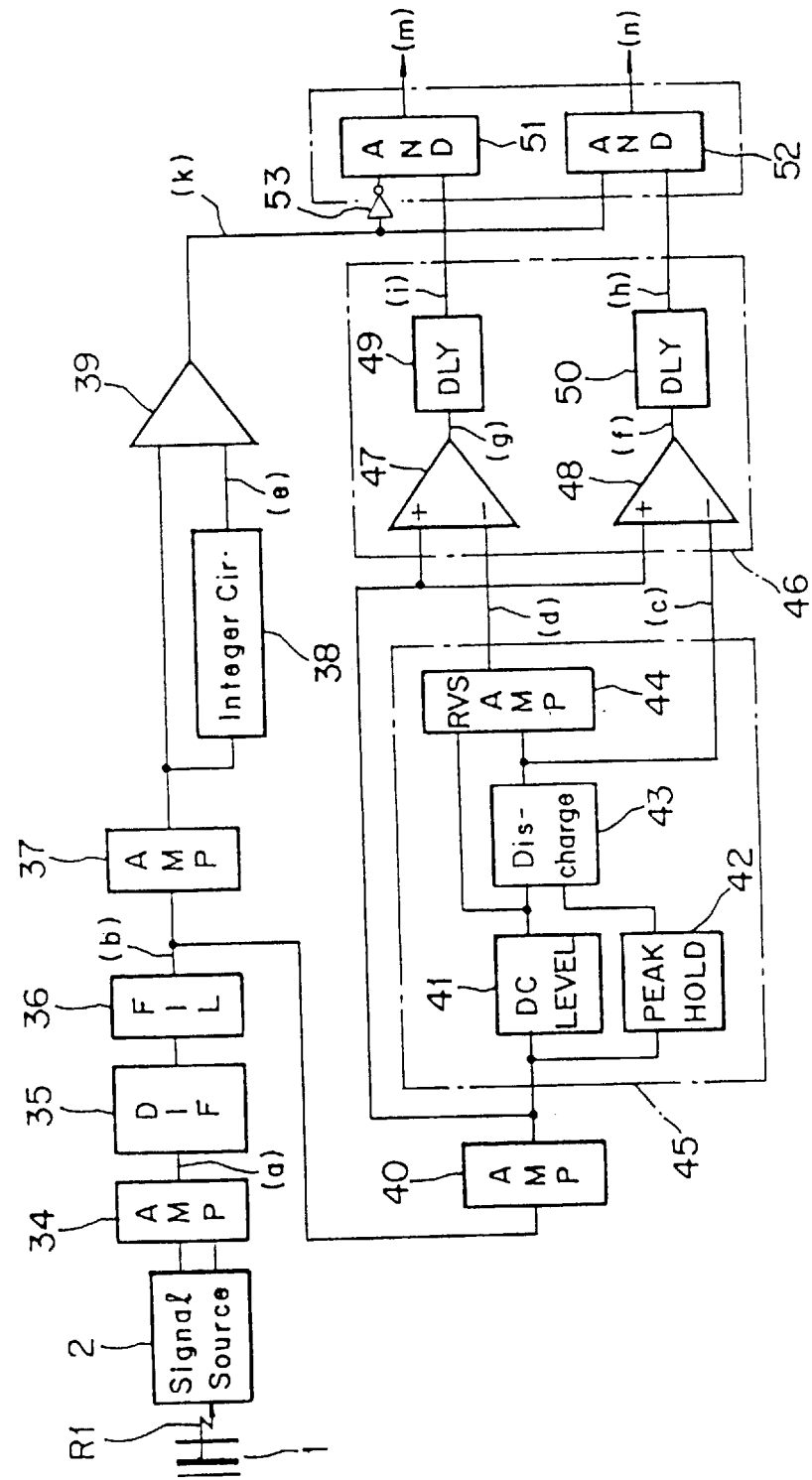
FIG. 10 is a block diagram showing the related art.

As shown in FIG. 2, according to the first embodiment of the present invention, the binary device for a bar code reader includes the amplifier 34, 37, and 40, the differentiating circuit (differentiating means) 35, the filter 36, the integrating circuit (delay means) 38, the comparator (comparing means) 39, the DC level circuit 41, a peak hold circuit 42, a discharging circuit 43, and inverse amplifier 44, and comparators 47 and 48, like that shown in FIG. 10. The binary device according to the first embodiment is different from that shown in FIG. 3 in that in FIG. 3 both the positive peak point determining circuit 61 and the negative peak point determining circuit 62 are arranged.

The reflection light R1 from the bar code 1 is converted to an electrical signal in the optical system 2. The electrical signal is subjected to a signal process ranging from the amplifier 34 to the comparator 39. Then the comparison result signal k is outputted, in the same manner as the signal process shown in FIGS. 10 and 11.

That is, the amplifier 34 amplifies the output of the optical system 2 to output an analog signal (input signal) a including a binary code signal. The differentiating circuit 35 differentiates the analog signal n to output as a differential signal k via the filter 36.

After the amplifier 37 amplifies the differential signal h, the integrating circuit 38 produces an output signal which is integrated and is also delayed. The comparator 39 compares the signal e with the differential signal b from the amplifier 37 to output the comparison result signal k as peak point detection information.

When the positive peak point is detected, the comparator 39 outputs the comparison result signal k as a leading signal. When the negative peak point is detected, the comparator 39 outputs the comparison result signal k as a trailing signal.

Figure 11:
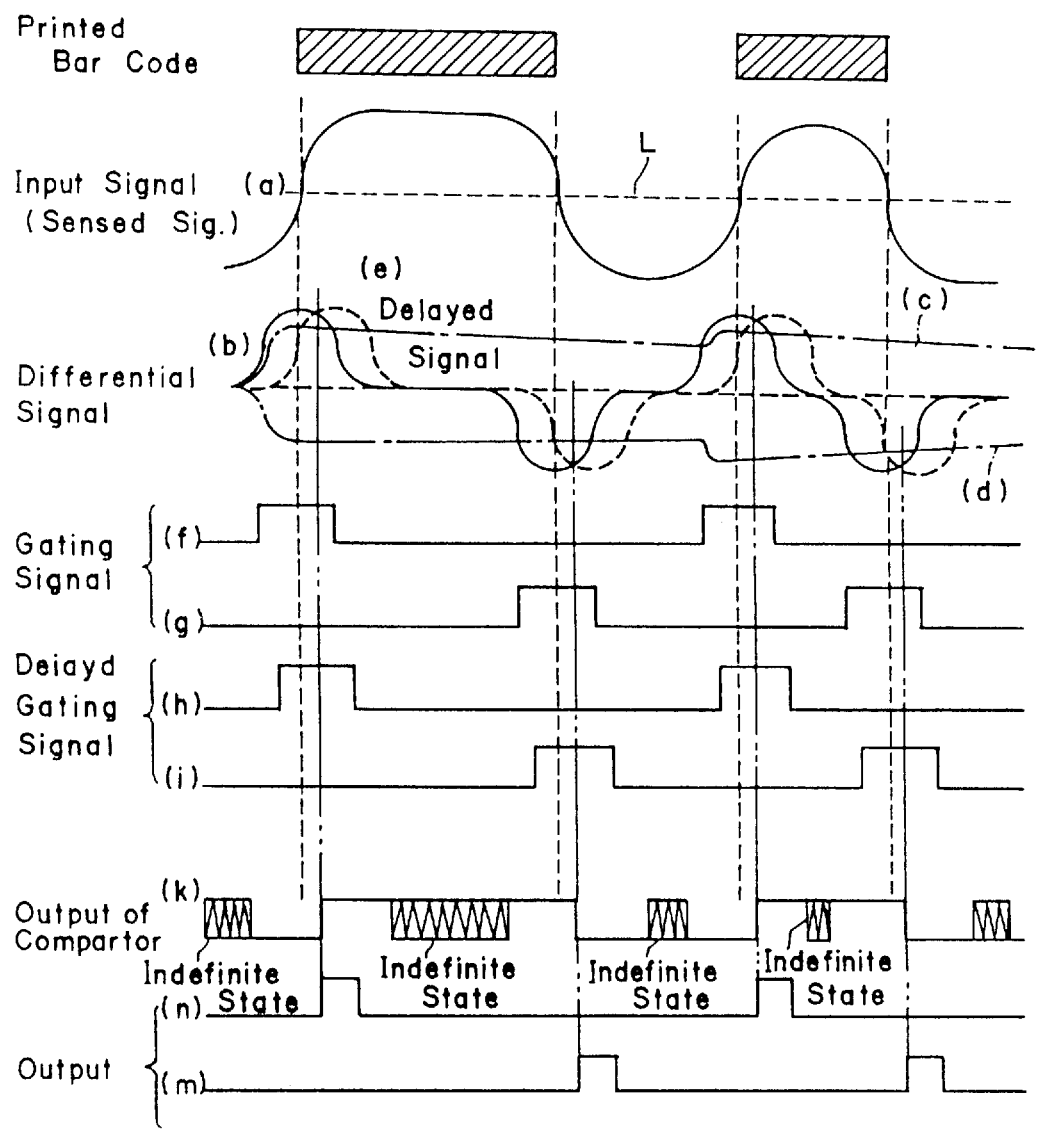
FIG. 11 is a signal sequence diagram showing the operation of the binary device in a bar code reader.
Figure 12:
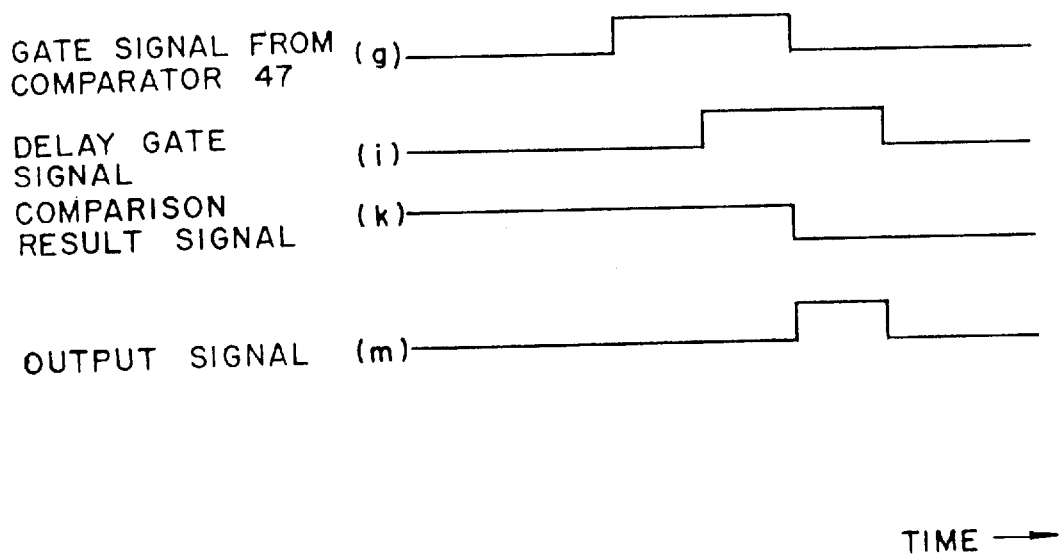
FIG. 12 is a diagram used for explaining the operation of the related art.
Figure 13:
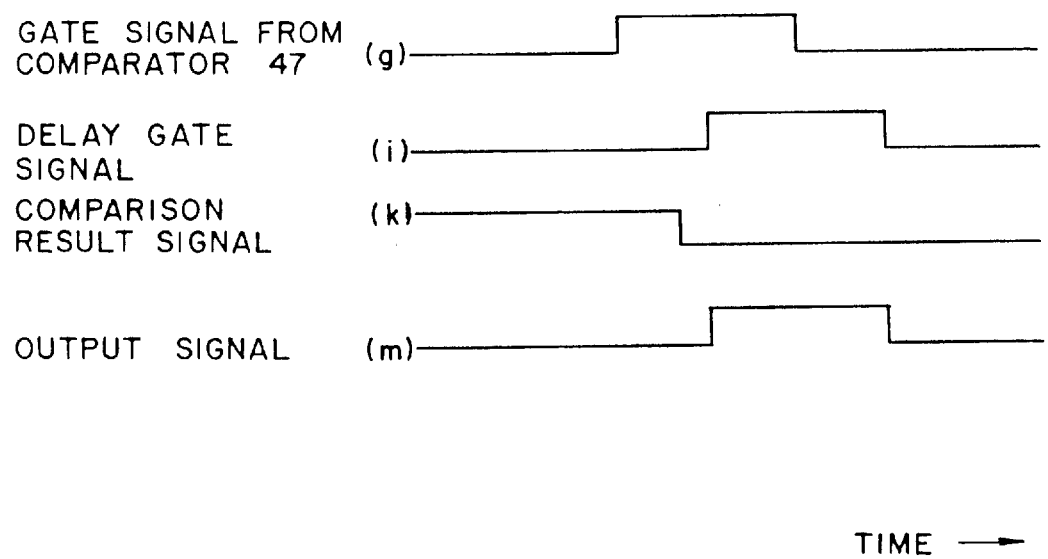
FIG. 13 is a diagram used for explaining the operation of the related art.
Figure 14:
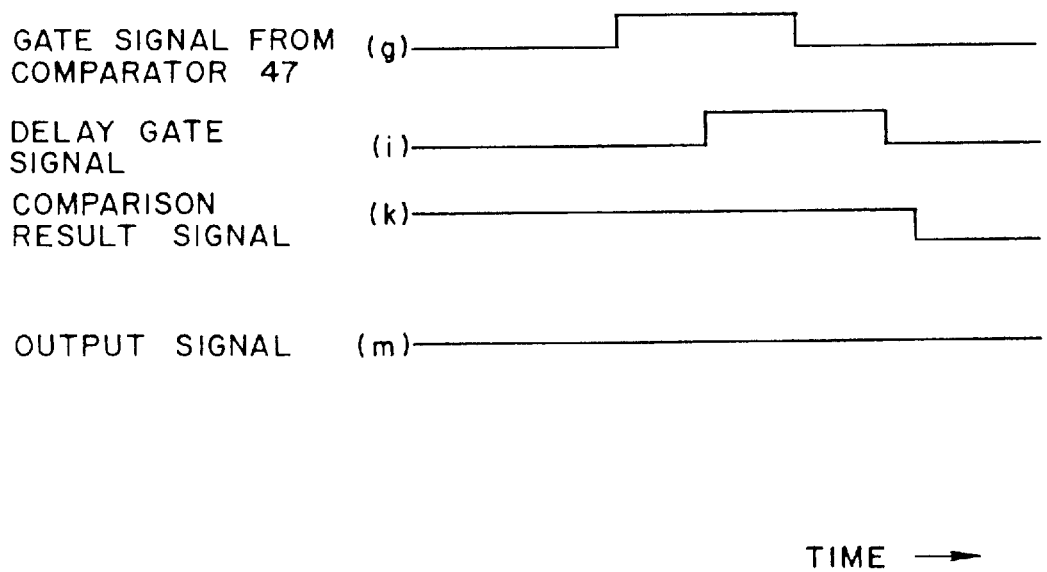
FIG. 14 is a diagram used for explaining the operation of the related art.

The integrating circuit 38 is used as shown in FIG. 11 to effect a delay and thereby serves as a delay circuit. The peak point detecting unit (means) 63 is formed of the amplifier 37, the integrating circuit 38 and the comparator 39 to detect the peak point of the differential signal b.

In the device shown in FIGS. 10 and 11, the differential signal b from the filter 36 is subjected to a signal process by means of the amplifier 40 and the slice signal generating unit 45 to output slice signals c and d. The slice signal generating unit 45 is formed of the DC level circuit 41, the peak hold circuit 42, the discharging circuit 43, and the inverse amplifier 44.

The comparator 47 inputs the slice signal d produced in the slice signal producing circuit 45 and the differential signal b from the amplifier 40 to output the gate signal g shown in FIGS. 10 and 11. The comparator 48 inputs the slice signal c produced in the slice signal producing circuit 45 and the differential signal b from the amplifier 40 to output the gate signal f shown in FIGS. 10 and 11.

That is, the gate signal g is output to indicate the detection that the gradient of the analog signal a is more than a predetermined positive level preset based on the slice signal c. The gate signal f is output from the comparator 47 to indicate detection that the gradient of the analog signal a is less than a predetermined negative level preset based on the slice signal d.

The amplifier 40, the slice signal producing circuit 45, and the comparator 47 forms a first gate signal outputting unit (means) 64 which outputs the gate signal g as the first gate signal when the differential signal b from the differentiating circuit 36 is less than the first set level. The amplifier 40, the slice signal producing circuit 45, and the comparator 48 forms a second gate signal outputting unit (means) 65 which outputs the gate signal f as the second gate signal when the differential signal b from the differentiating circuit 36 is less than the second set level.

The negative peak point determining circuit 62 receives the gate signal g from the comparator 47 and the signal from the inverter circuit 53, or an inversion signal of the comparison result signal k, to output the output signal m. The negative peak point determining circuit 62 has the configuration in detail shown in FIG. 3.

Figure 3:
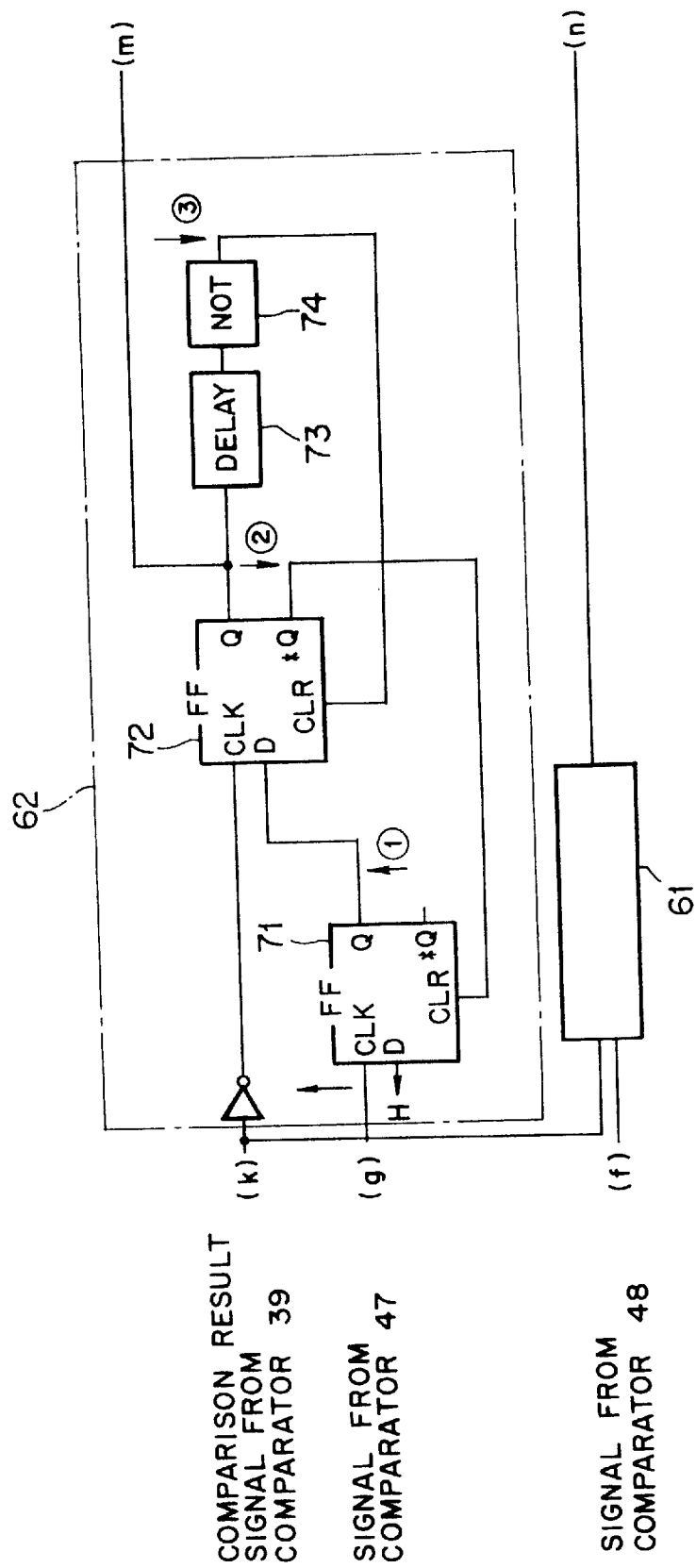
FIG. 3 is a block diagram showing the main portion of the first embodiment of the present invention.

Referring to FIG. 3, numerals 71 and 72 represents D-type flip-flops. The D-type flip-flop 71 receives the gate signal g as a clock signal from the comparator 47, and outputs an output signal to the flip-flop 72 in response to an inversion output.

The flip-flop 72 receives a signal k as a clock signal, which is an inversion signal of the comparison result signal inverted by the inverter circuit 53, and an output of the flip-flop 71, and an output signal from the inverter circuit 74, and outputs the output signal m as bar code information.

The delay circuit 73 delays the output signal m by a predetermined time to output the result to the inverter circuit 74. The inverted circuit 74 inverts the delayed signal from the delay circuit 73 and outputs the result to the flip-flop 72.

In FIG. 2, the positive peak point determining circuit 61 receives the gate signal f from the comparator 48 and the comparison result signal k from the comparator 39, and outputs the output signal n. The detailed circuit configuration is similar to the negative peak point determining circuit 62.

An explanation will be made below in detail as for the operation of the binary device for a bar code reader according to the first embodiment of the present invention, with reference to FIGS. 4 and 11.

That is, referring to FIG. 11, the optical system 2 converts the reflection light R1 into an electrical signal. The amplifier 34 amplifies the electrical signal to output an analog signal a including a binary code signal. The differentiating circuit 35 receives the analog signal a and outputs a differential signal b.

The integrating circuit 38 integrates the differential signal b to output the integration and delay signal e to the comparator 39. The comparator 39 compares the integration and delay signal e with the differential signal b inputted directly from the differentiating circuit 35 to output the comparison result signal k.

The variation in bar code information is detected based on the comparison result signal k. That is, when the maximum point in variation of the input signal a is detected, the peak point detecting unit 63 outputs a high level signal. When the maximum point in variation of the input signal a is not detected, the peak point detecting unit 63 outputs a low level signal. When a variation in the input signal is small, the comparison result signal k becomes an indefinite state.

The slice signal producing circuit 45 produces a positive level signal (a slice signal c) and a negative level signal (a slice signal d) and outputs them to the comparators 48 and 47, respectively.

The comparator 48 receives the slice signal c produced in the slice signal producing circuit 45 and the differential signal b from the amplifier 40 to output the gate signal g. When the gradient of the analog signal a is more than a positive level predetermined based on the slice signal c, the gate signal is a high level signal. When the gradient of the analog signal a is not more than a positive level predetermined by the slice signal c, the gate signal is a low level signal.

Similarly, the comparator 47 receives the slice signal d and the differential signal b and outputs the gate signal f. When the gradient of the analog signal a is less than a negative level predetermined by the slice signal d, the gate signal f is a high level signal. When the gradient of the analog signal a is not less than a negative level predetermined by the slice signal d, the gate signal f is a low level signal.

Figure 4:
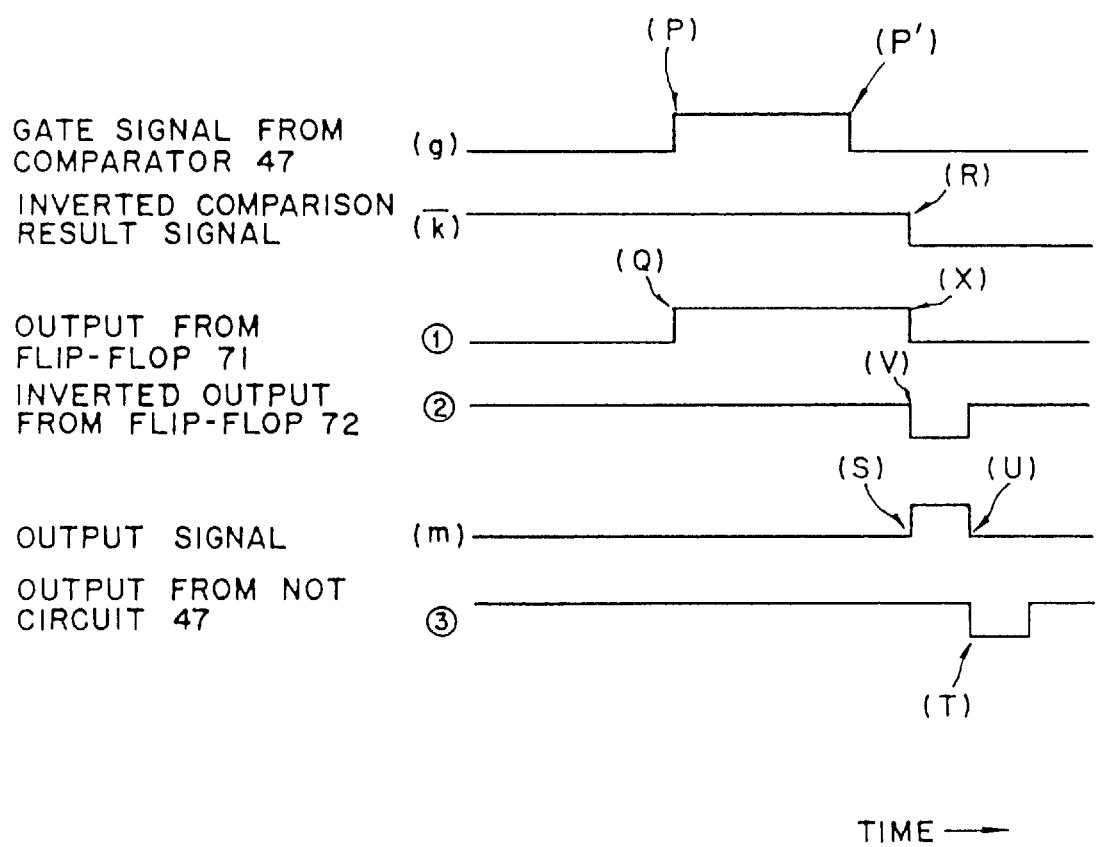
FIG. 4 is a signal sequence diagram used for explaining the operation of the first embodiment according to the present invention.

With reference to the signal sequence diagram shown in FIG. 4, the negative peak point determining circuit 62 receives the gate signal g and a signal obtained by inverting the comparison result signal k by the inverter circuit 53.

That is, the gate signal g is inputted as a clock signal to the flip-flop 71. The signal obtained by inverting the comparison result signal k is inputted as a clock signal to the flip-flop 72.

When the gate signal g is in a high level (the point P in the signal g), or the gradient of the analog signal a is less than a negative level predetermined by the slice signal d, the flip-flop 71 outputs a high level signal to the flip-flop 72 (the point Q in the signal (1)).

With a high level signal inputted from the flip-flop 71, when the inverted signal as a clock signal of the comparison result signal k is an low level signal (the point R in the signal k), or the maximum point of the variation of the input signal is detected, the flip flop 72 outputs a high level signal as an output signal (S point in the signal m), whereby it is judged that the color of the bar code has changed at the Q point.

The output signal is delayed by the delay circuit 73. The inverted circuit 74 inverts the delayed signal. The inverted delay signal is inputted as a clear signal to the flip-flop 72. For example, when the output signal m is a high level signal, the inverted delay signal becomes a low level signal (the point T in the signal (3)).

In response to the low level signal, the flip-flop 72 outputs the output signal m in a low level (the point U in the signal m).

The flipflop 71 inputs as a clear signal the inverted output signal (2) from the flipflop 72. The signal (2) is a low level signal at the point V corresponding to the S point in the signal m. Hence, in response to the low level signal, the flip-flop 71 changes its output signal from a high level to a low level (the point X in the signal (1)).

The positive peak point determining circuit 61 inputs a gate signal f and a comparison result signal k to output an output signal n by performing the signal process similar to that in the negative peak point determining circuit 62.

The negative peak point from the peak point detecting unit 63 can be detected after detecting the rise of the gate signal g after the negative peak point determining circuit 62. Since the positive peak point determining circuit 61 can detect the positive peak point, degradation of a conversion accuracy to the binary signal can be prevented even when the delay time from the peak point of the differential signal is small or the delay time from the peak point of the differential signal is large. Therefore, a suitable binary signal conversion can be performed without depending on the scanning rate of a laser beam.

Explanation of Second Embodiment

Next, the second embodiment according to the present invention will be explained below.

Figure 5:
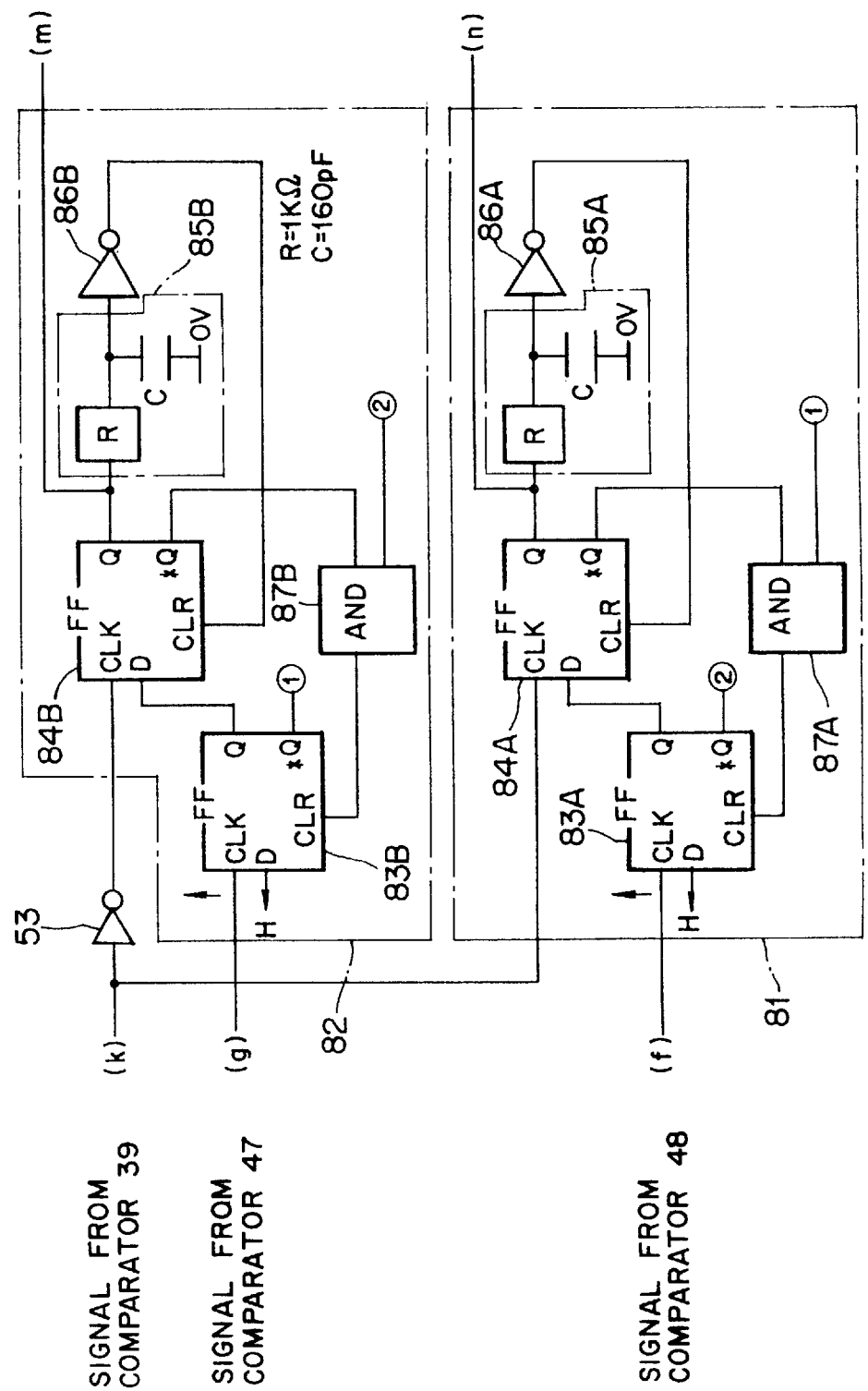
FIG. 5 is a block diagram showing the main portion of the second embodiment of the present invention.

FIG. 5 is a block diagram showing the main portion of the binary device for a bar code reader according to the second embodiment of the present invention. According to the present embodiment, the binary device for a bar code reader is used for the bar code reader shown in FIG. 9, similarly to the first embodiment. Similar to that shown in FIG. 2, the binary device is constituted by the amplifier 34, 37, and 40, the differential circuit (differential means) 35, the filter 36, the integrating circuit (delay means) 38, the comparator (comparing means) 39, the DC level circuit 41, and the peak hold circuit 42, the discharging circuit 43, the inverse amplifier 44, and the comparators 47 and 48 shown in FIG. 2. As shown in FIG. 5, the binary device also includes the positive peak point determining circuit 81 which is different from the positive peak point determining circuit 61, and the negative peak point determining circuit 82 which is different from the negative peak point determining circuit 62.

Like the negative peak point determining circuit 62 in the first embodiment, the negative peak determining circuit 82 inputs the gate signal g from the comparator 47 and the signal obtained by inverting the comparison result signal k from the comparator 39 by means of the inverter circuit 53, and outputs the output signal m.

Moreover, the negative peak point determining circuit 82 includes the flip-flops 83B and 84B, the CR circuit (delay circuit) 85B, and the inverter circuit 86B which correspond respectively to the flipflops 71 and 72, the delay circuit 73, and the inverter circuit 74 in the negative peak point determining circuit 62 in the first embodiment.

The flipflop 83B receives the gate signal g as a clock signal from the comparator 47 and outputs an output signal to the flip-flop 84B.

The flip-flop 84B inputs the signal as a clock signal obtained by inverting the comparison result signal k from the comparator 39 by means of the inverter circuit 53, and outputs an output signal m.

Similar to the delay circuit 73 in the first embodiment, the CR circuit 85B acts as a delay element which delays an input signal by a predetermined time.

Similar to the inverter circuit 74 in the first embodiment, the inverter circuit 86B inverts an input signal and outputs it as a clear signal to the flip-flop 84B.

Similar to the positive peak point determining circuit 61 in the first embodiment, the positive peak point determining circuit 81 inputs the gate signal f from the comparator 48 and the comparison result signal k from the comparator 39 and outputs the output signal n. The negative peak point determining circuit 81 includes flip-flops 83A and 84A, the CR circuit 85A, and the inverter circuit 86A which correspond respectively to the flip-flops 83B and 84B, the CR circuit 85B, and the inverter circuit 86B in the negative peak point determining circuit 82.

The AND circuit 87B inputs the inverted output from the flipflop 84B, and the inverted output from the flip-flop 83A in the positive peak point determining circuit 81. The AND circuit 87A inputs the inverted output from the flip-flop 84A, and the inverted output from the flip-flop 83B in the negative peak point determining circuit 82. Thus the flip-flops 84A and 84B are alternately cleared.

After the comparator 48 outputs the gate signal f to the flip-flop 83A, the flip-flop 84B outputs the clear signal to the flipflop 83B.

Likewise, after the comparator 47 outputs the gate signal g to the flip-flop 83B, the flip-flop 84A outputs the clear signal to the flip-flop 83A.

According to the second embodiment of the present invention, the binary device for a bar code reader produces the gate signals f and g, and the comparison result signal k, in the same manner as that in the first embodiment. The positive peak point determining circuit 81 inputs the gate signal f and the comparison result signal k. The negative peak point determining circuit 82 inputs the gate signal g and a signal formed by inverting the comparison result signal k.

When the gate signal g is inputted to the negative peak point determining circuit 82 and the inverted signal of the comparison result signal k is inputted to the flip-flop 84B, the output signal m in high level is outputted during a delay time determined by the CR circuit 85B.

Likewise, when the gate signal f is inputted to the positive peak point determining circuit 81 and the comparison result signal k is inputted to the flip-flop 84A, the output signal m in high level is outputted during a delay time determined by the CR circuit 85A.

After the comparator 48 inputs the gate signal f to the flipflop 83A, the flip-flop 84B outputs the clear signal to the flip-flop 83B. After the comparator 47 inputs the gate signal g to the flip-flop 83B, the clear signal is outputted from the flip-flop 84A to the flip-flop 83A. Thus the gate signal information inputted to the flip-flops 84A and 84B are alternately cleared.

Similarly to the first embodiment, the binary device for a bar code reader according to the second embodiment of the present invention includes the differentiating circuit 35, the integrating circuit 38, the comparator 39, the positive peak point determining circuit 81, and the negative peak point determining circuit 82. The positive peak point determining circuit 81 includes the AND circuit 87A. The negative peak point determining circuit 82 includes the AND circuit 87B. Therefore, there is an advantage in that a suitable binary signal conversion can be performed without depending on the laser beam scanning rate, whereby a binary signal corresponding to the bar code width can be outputted with a high accuracy.

Explanation of Third Embodiment

An explanation will be made below as for the third embodiment of the present invention.

Figure 6:
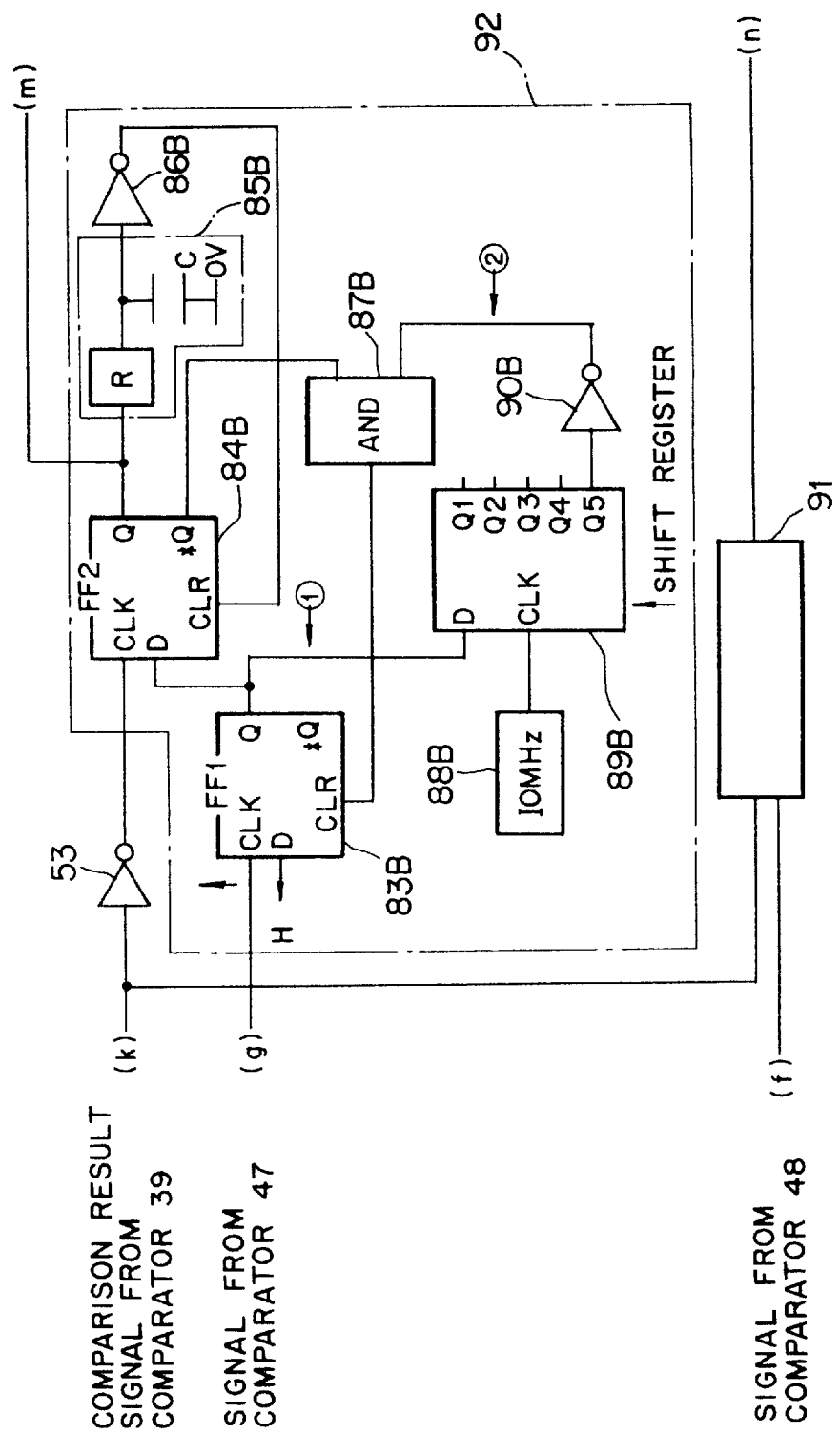
FIG. 6 is a block diagram showing the main portion of the third embodiment of the present invention.
Figure 9:
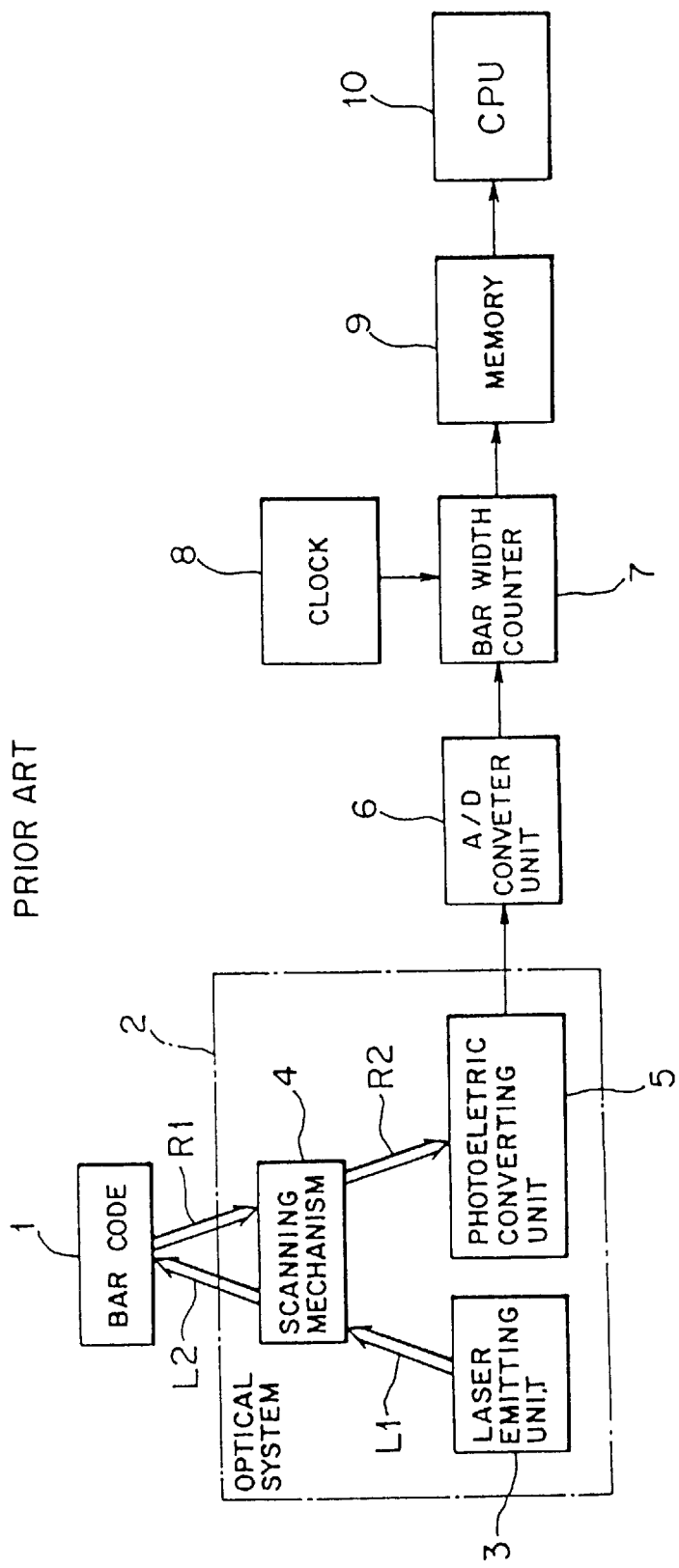
FIG. 9 is a block diagram showing the configuration of a conventional bar code reader.

FIG. 6 is a block diagram showing the main portion of the binary device in a bar code reader in the third embodiment according to the present invention. As shown in FIG. 9, the binary device according to the present embodiment is used for a bar code reader, like the first and second embodiments. The binary device includes the amplifier 34, 37, and 40, the differentiating circuit (differentiating means) 35, the filter 36, the integrating circuit (delay means) 38, the comparator (comparing means) 39, the DC level circuit 41, the peak hold circuit 42, the discharging circuit 43, the inverse amplifier 44, the comparator 47, and the comparator 48, in the same manner as that in FIG. 2. However, as shown in FIG. 6, the positive peak point determining circuit 91 is different from the positive peak point determining circuit 61 in configuration. Also, the negative peak point determining circuit 92 is different from the negative peak point determining circuit 62 in configuration.

The negative peak point determining circuit 92, shown in FIG. 6, can detect the negative peak point of the differential signal of the input signal a, like the first and second embodiments. The negative peak point determining circuit 92 includes the flip-flops 83B and 84B and the CR circuit 85B, and the inverter circuit 86B each which has the same function as that in the negative peak point determining circuit 82 shown in the second embodiment.

The oscillator 88B generates a clock signal of, for example, 10 MHz to input to the shift register 89B.

The shift register 89B stores the output signal from the flip-flop 83B or the gate signal information from the comparator 47 for a predetermined time (for example, 500 nsec), and then outputs it to the inverter circuit 90B.

The AND circuit 87B inputs the inverted output from the flip-flop 84B and the inverted output from the flipflop 83B delayed by the inverter circuit 90B and outputs a clear signal for clearing the value of the flip flop 83B when the maximum point in variation of the input signal a is not detected based on the comparison result signal k from the comparator 39 during a predetermined time after the gate signal f in high level from the comparator 47 has been inputted to the flip-flop 83B.

The positive peak point determining circuit 91 is constituted similarly to the configuration of the negative peak point determining circuit 92. When the comparator 39 receives the comparison result signal k and the gate signal f from the comparator 48, the positive peak point of the differential signal of an input signal can be detected.

According to the third embodiment of the present invention, the binary device in a bar code reader produces the gate signals f and g and the comparison result signal k, like the second embodiment. The positive peak point determining circuit 91 receives the gate signal f and the comparison result signal k. The negative peak point determining circuit 92 receives the gate signal g and the signal formed by inverting the comparison result signal k.

When the negative peak point determining circuit 92 receives the gate signal g while the flip-flop 84B receives an inverted signal of the comparison result signal k, the output signal m in high level is outputted only during a predetermined delay time defined by the CR circuit 85B.

Similarly, when the positive peak point determining circuit 91 receives the gate signal f and the comparison result signal k, it outputs a high level signal as an output signal n during a delay time defined by the CR circuit (not shown).

The clear signal is outputted from the flip-flop 84B to the flipflop 83B when the AND circuit 87B receives the signal formed by delaying and inverting the gate signal g. The clear signal is inputted to the flip-flop in the positive peak point determining circuit 91 to which the gate signal f is inputted.

In the positive peak point determining circuit 91 and the negative peak point determining circuit 92, when the comparison result signal k is not inputted within a predetermined time (500 nsec) after the leading information of the gate signal has been detected, the gate signal information is cleared.

According to the third embodiment of the present invention, the binary device for a bar code reader includes the differentiating circuit 35, the integrating circuit 38, the comparator 39, the positive peak point determining circuit 91, and the negative peak point determining circuit 92. The positive peak point determining circuit 91 includes an oscillator, a shift register, an inverted circuit, and an AND circuit. The negative peak point determining circuit 92 includes an oscillator, a shift register, an inverted circuit, and an AND circuit. Hence there is an advantage in that a suitable binary signal conversion occurs without depending on the laser beam scanning rate, whereby a binary signal corresponding to a bar code width is outputted with accurate accuracy.

Explanation of Fourth Embodiment

Next, the fourth embodiment according to the present invention will be explained below.

Figure 7:
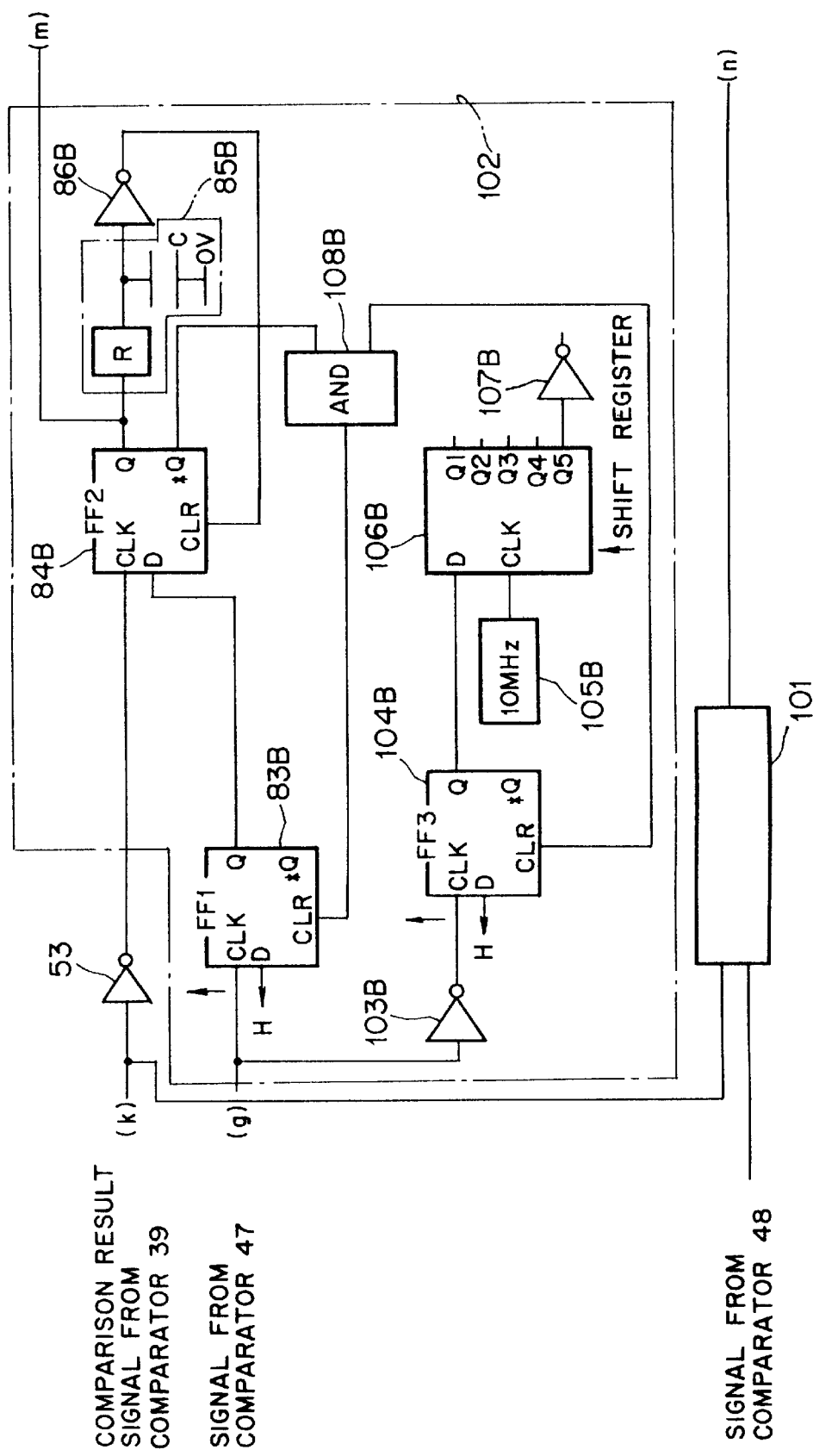
FIG. 7 is a block diagram showing the main portion of the fourth embodiment of the present invention.

FIG. 7 is a block diagram showing the main portion of the binary device in a bar code reader according to the third embodiment of the present invention. Like the first to fourth embodiments, the binary device according to the present embodiment is used for a bar code reader as shown in FIG. 9. The binary device includes the amplifiers 34, 37, and 40, the differentiating circuit (differentiating means) 35, the filter 36, the integrating circuit (integrating means) 38, the comparator (comparing means) 39, the DC level circuit 41, the peak hold circuit 42, the discharging circuit 43, the inverse amplifier 44, and comparators 47 and 48. As shown in FIG. 7, the positive peak point determining circuit 101 is structurally different from the positive peak point determining circuit 91. The negative peak point determining circuit 102 is structurally different from the negative peak point determining circuit 92.

As shown in FIG. 7, in the same manner as the first to third embodiments, the negative peak point determining circuit 102 detects the negative peak point of the differential signal of the input signal a. The negative peak point determining circuit 102 includes the flip-flops 83B and 84B, the CR circuit 85B, and the inverter circuit 86B, each which has the same function as that in the negative peak point determining circuit 92 in the third embodiment.

The inverter circuit 103B inverts the gate signal g from the comparator 47.

The flipflop 104B inputs the inverted gate signal from the inverted circuit 103B, and outputs a high level signal to the shift register 106B when an high level signal is detected.

The oscillator 105B generates a clock signal of, for example, 10 Mhz and outputs it to the shift register 106B.

The shift register 106B stores the output signal from the flip-flop 104B or the signal formed by inverting the gate signal g from the comparator 47 for a predetermined time (for example, 500 nsec), and outputs it to the inverter circuit 107B.

The AND circuit 108B inputs the inverted output signal from the flipflop 84B and the signal from the inverted circuit 107B formed by delaying and inverting the output signal from the flip-flop 104B. The AND circuit 108B outputs a clear signal to clear the flip-flop 83B when the flip-flop 83B detects the trailing information of a gate signal from the comparator 47 but the maximum point of the variation of the input signal a is not detected during a predetermined time in accordance with the comparison result signal k from the comparator 39.

The positive peak point determining circuit 101 has the same configuration as the negative peak point determining circuit 102. When the comparison result signal k from the comparator 39 and the gate signal f from the comparator 48 are inputted, the positive peak point determining circuit 101 detects the positive peak point or the differential signal of an input signal.

According to the fourth embodiment of the present invention, the binary device for a bar code reader produces the gate signals f and g and the comparison result signal k, like the first to third embodiments. The positive peak point determining circuit 101 receives the gate signal f and the comparison result signal k. The negative peak point determining circuit 102 receives the gate signal g and the signal formed by inverting the comparison result signal k.

When the negative peak point determining circuit 102 receives the gate signal g, the flip-flop 84B receives the signal formed by inverting the comparison result signal k and outputs a high level signal as an output signal m during a delay time defined by the CR circuit 85B.

Similarly, when receiving the gate signal f and the comparison result signal k, the positive peak point determining circuit 101 outputs the output signal n of high level during the delay time defined by the CR circuit (not shown).

The clear signal is outputted from the flipflop 84B to the flipflop 83B when the signal formed by delaying and inverting the inverted gate signal g from the inverted circuit 90B is inputted to the flip-flop 108B. The clear signal is inputted to a flip-flop in the positive peak point determining circuit 101, the flip-flop inputting the gate signal f.

In the positive point determining circuit 101 and the negative peak point determining circuit 102, the gate signal information inputted is cleared when the comparison result signal k is inputted during the predetermined time (500 nsec) after the trailing information of the gate signal has been detected.

As described above, according to the fourth embodiment of the present invention, the binary device for a bar code reader includes the differentiating circuit 36, the integrating circuit 38, the comparator 39, the positive peak point determining circuit 102, and the negative peak point determining circuit 101. The positive peak point determining circuit 101 includes an oscillator, a shift register, an inverted circuit, and an AND circuit. The negative peak point determining circuit 102 includes an oscillator, a shift register, an inverter circuit, and an AND circuit. Hence a suitable binary signal conversion can be performed without depending on the laser beam scanning rate and a binary signal corresponding to a bar code width can be outputted with high accuracy. In comparison with the third embodiment, this embodiment has an advantage in that a bar code reading function can be realized with higher redundancy to the scanning rate.

Miscellaneous

Figure 8:
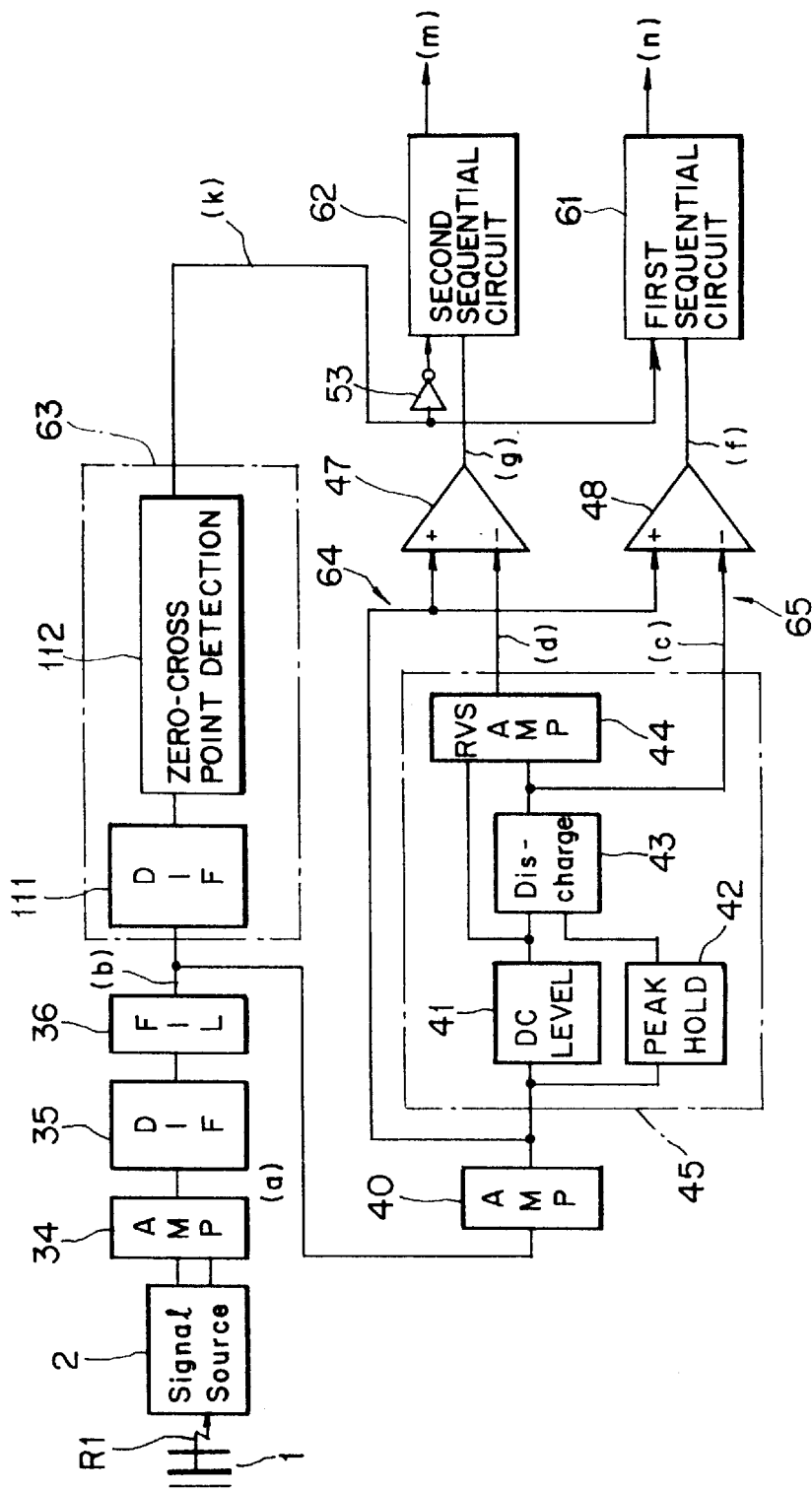
FIG. 8 is a block diagram showing the main portion of another embodiment of the present invention.

In the above embodiments, the peak point detecting unit 63 includes the amplifier 37, the integrating circuit 38, and the comparator 39. The integrating circuit 38 delays the differential signal from the differentiating circuit 36 to detect the peak point. However, according to the binary device in a bar code reader, the peak point detecting unit 63, as shown in FIG. 8, can be formed of the double differentiating circuit (means) 111 for differentiating further the differential signal from the differentiating circuit 36, and the zero-cross point detecting unit (means) 112 for detecting the zero-cross point of the double differential signal from the double differentiating circuit 111 to detect the positive and negative peak points of the differential signal.

What is claimed is:

1. A binary device suitable for a bar code reader, comprising:

differentiating means for differentiating an analog signal containing binary code information and outputting a differentiated signal;

peak point detecting means for generating a leading edge of a comparison signal at a positive peak of the differentiated signal and a trailing edge of the comparison signal at a negative peak of the differentiated signal;

first gate signal output means for outputting a first gate signal having a high level when the differentiated signal is greater than a positive threshold;

second gate signal output means for outputting a second gate signal having a high level when the differentiated signal is less than a negative threshold;

positive peak determining means for identifying a positive peak in the differentiated signal even when the leading edge of the comparison signal occurs after a trailing edge of the first gate signal; and negative peak determining means for identifying a negative peak in the differentiated signal even when the trailing edge of the comparison signal occurs after a trailing edge of the second gate signal.

2. A binary device suitable for a bar code reader according to claim 1,
   wherein said positive peak point determination means detects the positive peak in the differentiated signal during a first set time period after a signal change in said first gate signal; and
   wherein said negative peak point determination means detects the negative peak in the differentiated signal during a second set time period after a signal change in said second gate signal.

3. A binary device suitable for a bar code reader according to claim 1, wherein said peak point detecting means comprises;
   delay means for delaying the differentiated signal from said differentiating means; and
   comparing means for comparing the delay signal delayed by said delay means with the differentiated signal from said differentiating means to detect the positive and negative peak points of said differentiated signal.

4. A bar code reader according to claim 1, wherein said peak point detecting means comprises:
   double differentiating means for further differentiating the differentiated signal from said differentiating means; and
   zero-cross point detecting means for detecting the zero-cross point of the double differentiated signal from said double differentiating means to detect the positive and negative points in the differentiated signal.

5. A binary device suitable for a bar code reader according to claim 2, further comprising resetting means for resetting said first gate signal when said positive peak point determination means cannot detect the positive peak point in the differentiated signal after a lapse of said first set time.

6. A binary device suitable for a bar code reader according to claim 2, further comprising resetting means for resetting said second gate signal when said negative peak point determination means cannot detect the negative peak point in the differentiated signal after a lapse of said second set time.

7. A binary device suitable for a bar code reader according to claim 2,
   wherein said positive peak point determination means detects the leading edge of said first gate signal, detects the trailing edge of said first gate signal, and then detects the positive peak in the differentiated signal; and
   wherein said negative peak point determination means detects the leading edge of said second gate signal, detects the trailing edge of said second gate signal, and then detects the negative peak in the differentiated signal.

8. A binary device suitable for a bar code reader according to claim 2, wherein said positive peak point determination means detects the trailing edge of said first gate signal, detects the leading edge of said first gate signal, and then detects the positive peak in the differentiated signal; and
   wherein said negative peak point determination means detects the trailing edge of said second gate signal, detects the leading edge of said second gate signal, and then detects the negative peak in the differentiated signal.

9. A binary device for a bar code reader according to claim 7, further comprising resetting means for resetting said first gate signal when said positive peak point determination means cannot detect the positive peak in the differentiated signal.

10. A binary device for a bar code reader according to claim 8, further comprising resetting means for resetting said second gate signal when said negative peak point determination means cannot detect the negative peak in the differentiated signal.

11. The binary device suitable for a bar code reader according to claim 1,
    wherein said positive peak determination means includes:
       a first flip-flop for outputting a high-level signal when the leading edge is clocked from said peak point detecting means; and
       a second flip-flop for outputting the high-level signal from said first flip-flop as the positive peak of the differentiated signal when the first gate signal is clocked from said first gate signal output means; and
    wherein said negative peak determination means includes:
       a third flip-flop for outputting a high-level signal when the trailing edge is clocked from said peak point detecting means; and
       a fourth flip-flop for outputting the high-level signal from said third flip-flop as the negative peak of the differentiated signal when the second gate signal is clocked from said second gate signal output means; and
    wherein said first flip-flop outputs said high level signal until the output from said second flip-flop falls; and said third flip-flop outputs said high level signal until the output from said fourth flip-flop falls.

12. A circuit for processing an analog electric signal which is obtained from a photoelectric transformation of a reflected light when scanning a bar code by a light beam, said circuit comprising:
    differentiating means for differentiating the analog electric signal and outputting a differentiated signal;
    peak point detecting means for generating a leading edge of a comparison signal at a positive peak of the differentiated signal and a trailing edge of the comparison signal at a negative peak of the differentiated signal;
    first gate signal output means for outputting a first gate signal having a high level when the differentiated signal is greater than a positive threshold;
    second gate signal output means for outputting a second gate signal having a high level when the differentiated signal is less than a negative threshold;
    positive peak determining means for identifying a positive peak in the differentiated signal even when the leading edge of the comparison signal occurs after a trailing edge of the first gate signal; and
    negative peak determining means for identifying a negative peak in the differentiated signal even when the trailing edge of the comparison signal occurs after a trailing edge of the second gate signal.

* * * * *